Dec. 21, 1926.
L. K. VAUGHAN
1,611,794
ALMOND SHELLER AND CRACKER
Filed Jan. 14, 1925
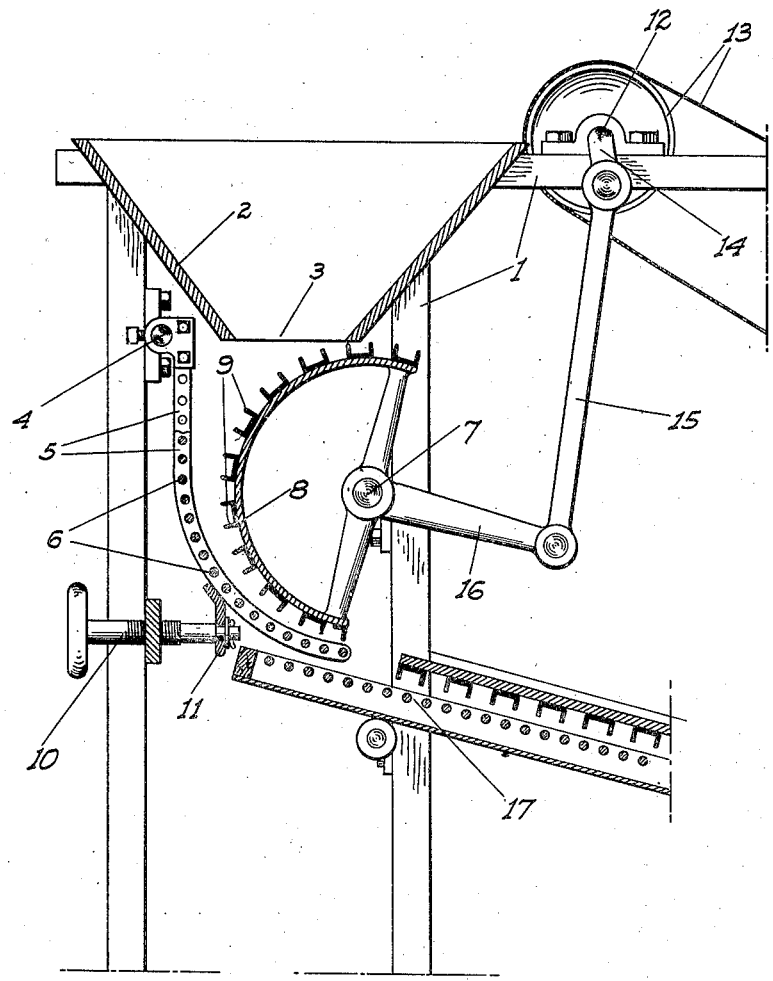
INVENTOR
Louis K. Vaughan
BY
ATTORNEY Patented Dec. 21, 1926.

1,611,794

UNITED STATES PATENT OFFICE.

LOUIS K. VAUGHAN, OF WOODLAND, CALIFORNIA.

ALMOND SHELLER AND CRACKER.

Application filed January 14, 1925. Serial No. 2,301.

This invention relates to improvements in devices for cracking and shelling hulled nuts and particularly almonds, my principal object being to provide a device for the purpose which will efficiently crack and remove the shells without breaking the meats and which has a good capacity even when made of a small size.

Another object of the invention is to provide a device for the purpose by which any desired pressure in the almonds being crushed may be instantly attained and altered by a single simple adjustment and in which interchanging of parts to suit different varieties and sizes of nuts may be easily and quickly carried out.

A further object of the invention is to provide a device of this character whose working parts are so arranged that with the operation thereof jamming of the shells and meats together after the nuts have been cracked and the shells separated from the meats, is avoided, and the machine will automatically keep itself clear so that the flow of nuts will never be retarded.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

The figure on the drawing is a fragmentary sectional view of an almond handling machine showing my improved shelling and cracking device.

Referring now more particularly to the numerals of reference on the drawings, the numeral 1 denotes a rigid framework of suitable character on which is mounted an intake hopper 2 to receive the nuts to be cracked, said hopper having a horizontal discharge opening 3 at its lower end.

Disposed ahead of and above the hopper opening 3 is a transverse shaft 4 journaled on the adjacent frame members 1. Removably fixed on said shaft are transversely spaced arms 5, extending between and secured to which from top and bottom thereof are horizontal bars 6 disposed in suitably spaced relation according to the size and variety of nuts being handled. These bars are preferably of circular cross section.

The upper portions of the arms 5 are vertical but the lower portions thereof have a circular curvature projecting rearwardly under the hopper a certain distance therebelow. The bars 6 are of course arranged about said curvature also.

Journaled on the frame-work 1 to the rear of the arms 5 is a shaft 7, which is disposed in a horizontal plane about half way between the upper opening 3 and the lower ends of the arms 5. Fixed on said shaft 7 is a drum 8 substantially semi-circular in form, the curvature of which is approximately the same as that of the lower portions of the arms 5. This drum, however, is set eccentric with the curved portions of said arms so as to make a converging angle therewith toward the lower ends thereof. This arrangement, as will be seen, provides a substantially wedge shaped opening between these members.

Fixed transversely and projecting outwardly from the drum is a plurality of suitably spaced radial projections 9 which are spaced from the lowermost bars 6 a sufficient distance to enable nut meats to pass therebetween without being bruised or damaged in any way.

This distance may be easily adjusted at will by means of a horizontal set-screw 10 mounted on the frame 1 and engaging the lug 11 mounted in connection with the arms 5 adjacent the lower ends thereof.

The drum is reciprocated or rocked through a certain arc from a shaft 12 which is driven by a belt drive 13 or other suitable means in the following manner:

On the shaft 12 is a crank arm 14 to which is connected one end of a rod 15, the other end of which is connected to a radial arm 16 fixed on the shaft 7. The arm 16 is considerably longer than the crank 14 so that with a complete rotation of the latter the arm 16 and consequently the drum will reciprocate through a relatively small arc.

The upper end of the drum is so located relative to the adjacent edge of the hopper that said drum during its downward reciprocating movement will never move inwardly of said edge. At the same time with such downward movement the lower end of the drum extends beyond the lower ends of the arms 5.

In operation the nuts to be cracked or shelled are placed in the hopper 2 and pass thence through the opening 3 into the wedge shaped space between the bars 6 and projections 9. With the downward reciprocation of the drum certain of these nuts are forced down into the narrowest space between the members 6 and 9, the abrading action of said member with such drum movement causing the shells to be cracked and removed from the nuts. Then with the upward stroke of the drum the pressure tending to jam the nuts together is removed and the meats and shells are loosened up and separated from each other. This enables the meats to fall between the openings and be free of any possible contact with the drum projections upon the next downward and crushing stroke of the drum.

At the same time any meats which may remain between the members 6 and 9 adjacent the lower end thereof upon the termination of the upward stroke of the drum are dragged away from the bars 6 when said projections with the downward movement of the drum project beyond the bars.

By reason of the adjustability of the arms 5 and consequently the bars 6 to and from the drum the amount of cracking or wedging pressure applied to the nuts between the abrading members may be easily adjusted to suit different conditions, as will be evident. This is a highly necessary provision since, as is well known, some nuts require considerably more pressure to crack them than do others. This arrangement also, as previously stated, enables nuts of various sizes to be handled with equal efficiency.

By loosening the arms 5 from the shaft 4 the latter may be easily withdrawn from its supports on the frame 1, and upon removing the screw 10 from engagement with the lug 11 the arms 5 and bars 6 may be removed as a unit from the machine and replaced by another similar unit having bars of different sizes or spacing as may be found to be desirable under different conditions.

It will also be seen that owing to the upper part of the drum being immediately under the hopper opening 3 the nuts from said hopper will settle continuously on the drum between the projections 9. With the rotation of the drum therefore the nuts are positively moved down into the restricted space adjacent the lower end of the drum. This arrangement also causes the mass of the nuts to be constantly agitated, preventing the jamming thereof adjacent the hopper.

After the nuts pass between the abrading members the meats etc. drop from between said members onto a reciprocating screen structure 17 of suitable character to segregate the meats from the shells. This structure may be as shown in my Patent No. 1,294,852 or of the type illustrated in my co-pending application for patent on an "almond hulling machine" filed November 3rd, 1923, Serial No. 672,355. In any event however, this structure forms no part of my present invention.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A nut shelling device including a reciprocatable drum having abrading elements on its outer surface, and a cooperating and relatively stationary abrading element mounted in connection with the drum; said stationary abrading element including spaced side-members, and spaced bars disposed parallel to the axis of the drum, extending between said members.

2. A nut shelling device including a reciprocatable drum, radial and transversely extending projections disposed in circumferentially spaced relation on the outer face of the drum, and a cooperating stationary abrading structure disposed at a diverging angle to the face of the drum and including spaced bars disposed parallel to the drum.

In testimony whereof I affix my signature.

LOUIS K. VAUGHAN.